United States Patent
Fritsch et al.

(10) Patent No.: US 12,483,184 B2
(45) Date of Patent: Nov. 25, 2025

(54) TEMPERATURE DETERMINATION METHOD FOR MAGNET TEMPERATURES ON MAGNETS OF ELECTRIC MOTORS

(71) Applicant: Siemens Aktiengesellschaft, Munich (DE)

(72) Inventors: Christoph Fritsch, Pommersfelden (DE); Stefan Künzel, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 155 days.

(21) Appl. No.: 18/575,682

(22) PCT Filed: Jun. 3, 2022

(86) PCT No.: PCT/EP2022/065221
§ 371 (c)(1),
(2) Date: Dec. 29, 2023

(87) PCT Pub. No.: WO2023/274664
PCT Pub. Date: Jan. 5, 2023

(65) Prior Publication Data
US 2024/0339950 A1  Oct. 10, 2024

(30) Foreign Application Priority Data
Jul. 1, 2021 (EP) .................... 21183214

(51) Int. Cl.
H02P 23/14 (2006.01)
H02P 29/66 (2016.01)

(52) U.S. Cl.
CPC .................. H02P 29/662 (2016.11)

(58) Field of Classification Search
CPC ............... H02P 23/14; H02P 29/662
(Continued)

(56) References Cited

U.S. PATENT DOCUMENTS

| | | | |
|---|---|---|---|
| 7,979,171 B2* | 7/2011 | Wu ............... | H02P 29/662 701/32.9 |
| 2013/0342137 A1* | 12/2013 | Yamaguchi ......... | H02P 29/032 318/400.3 |

(Continued)

FOREIGN PATENT DOCUMENTS

| | | |
|---|---|---|
| DE | 102015005555 A1 | 11/2016 |
| JP | 2009261182 A | 11/2009 |
| JP | 2017175878 A | 9/2017 |

OTHER PUBLICATIONS

*PCT International Search Report mailed Jun. 10, 2022 corresponding to PCT International Application No. PCT/EP2022/065221 filed Mar. 6, 2022.*

Primary Examiner — Gabriel Agared
(74) Attorney, Agent, or Firm — Henry M. Feiereisen LLC

(57) ABSTRACT

A temperature determination method for magnet temperatures on magnets of electric motors has a test mode. A first voltage is applied to a test winding of a test motor with test magnets for impressing a first voltage-time area at first angles of a test motor rotating field. The test magnets are subject to a predefined magnet temperature. First current values are ascertained at the first angles and stored based on the predefined magnet temperature. In a normal mode, a second voltage is applied to a motor winding of an operations motor with motor magnets for impressing a second voltage-time area at second angles of a motor rotating field. The motor magnets have an operation-dependent magnet temperature. Second current values are determined at the second angles and stored based on the operation-dependent magnet temperature. The operation-dependent magnet temperature is determined by comparing a second current value with a first current value.

11 Claims, 4 Drawing Sheets

(58) Field of Classification Search
USPC .................................................. 318/400.08
See application file for complete search history.

(56) References Cited

U.S. PATENT DOCUMENTS

| | | | |
|---|---|---|---|
| 2014/0354204 A1* | 12/2014 | Tachibana | H02P 6/10 |
| | | | 318/473 |
| 2021/0067075 A1* | 3/2021 | Berry | B60L 15/20 |
| 2021/0234495 A1* | 7/2021 | Seo | G01K 7/36 |
| 2021/0234496 A1* | 7/2021 | Seo | H02P 29/662 |

\* cited by examiner

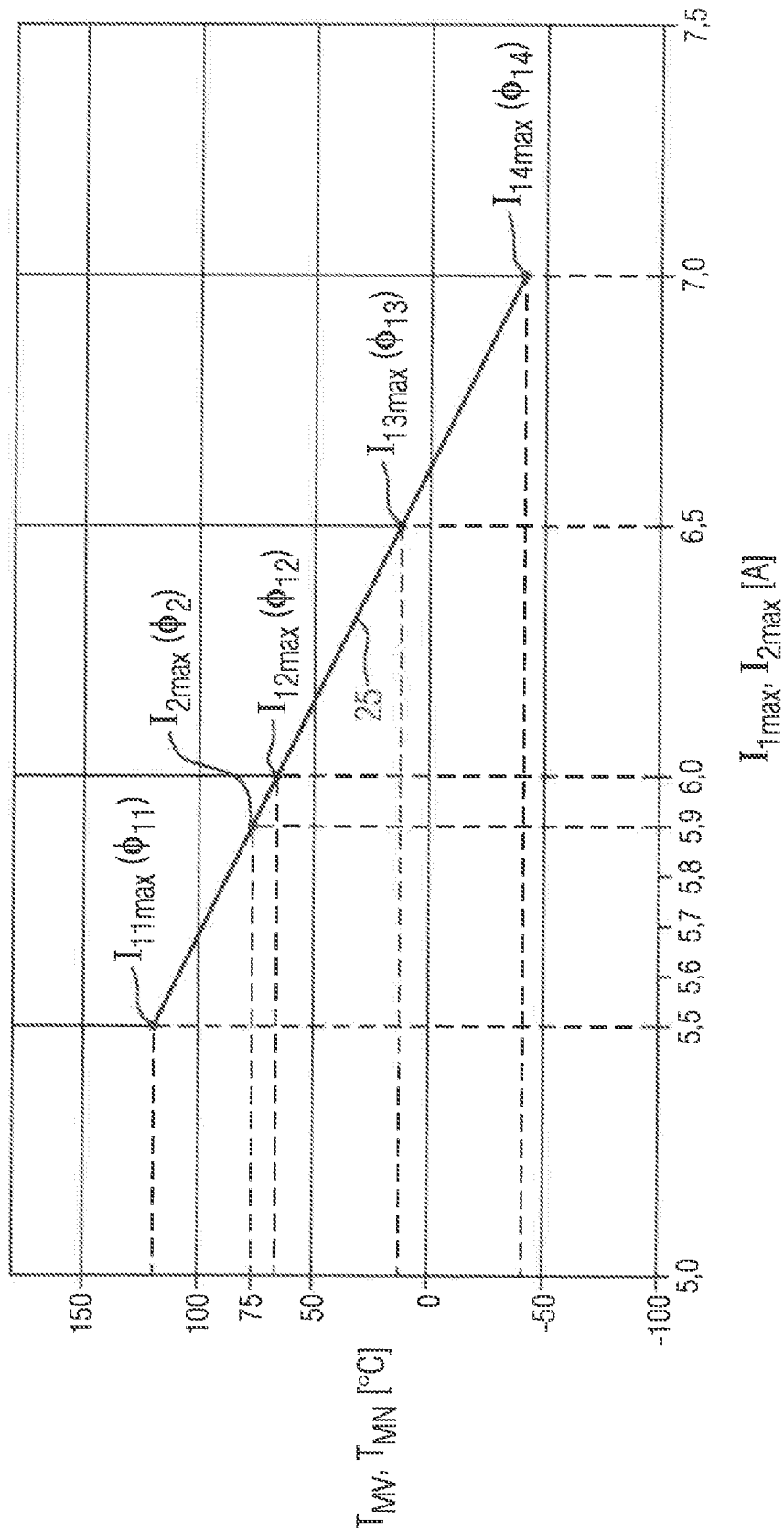

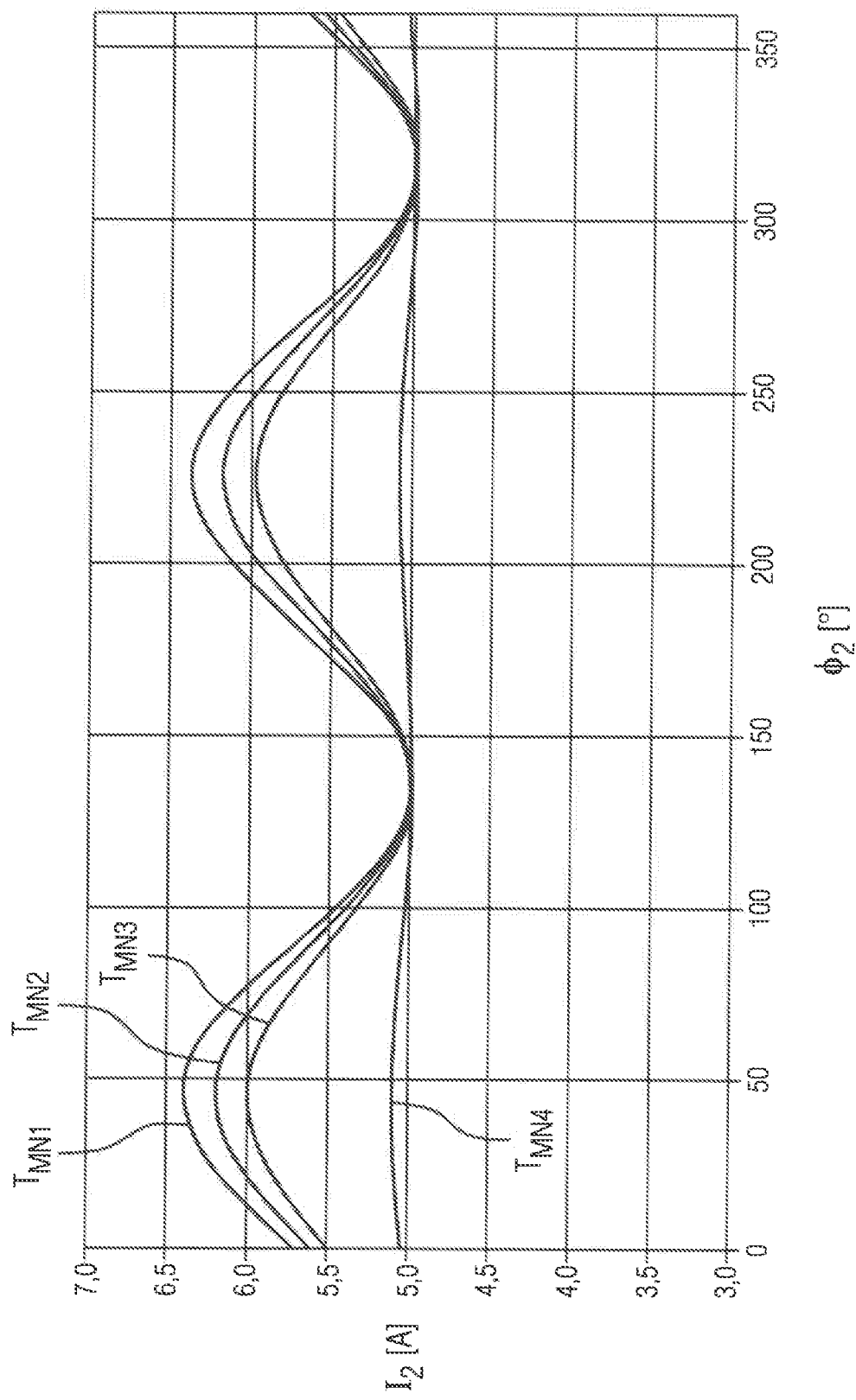

TEMPERATURE DETERMINATION METHOD FOR MAGNET TEMPERATURES ON MAGNETS OF ELECTRIC MOTORS

CROSS-REFERENCES TO RELATED APPLICATIONS

This application is the U.S. National Stage of International Application No. PCT/EP2022/065221, filed Jun. 3, 2022, which designated the United States and has been published as International Publication No. WO 2023/274664 A1 and which claims the priority of European Patent Application, Serial No. 21183214.2, filed Jul. 1, 2021, pursuant to 35 U.S.C. 119 (a)-(d).

BACKGROUND OF THE INVENTION

The Invention relates to a method for determining magnet temperatures on magnets of electric motors, involving steps in a test mode and in a normal mode.

The magnet temperature of electric motors, such as synchronous motors in particular, is usually unknown or at least very imprecisely known during operational use as intended in a user environment, hereinafter referred to as a normal mode.

For example, in most cases no temperature sensors for measuring or determining the motor temperature are disposed on the rotors of the synchronous machine. If, however, a corresponding temperature measurement is required, it is difficult and therefore generally costly to implement such temperature sensors on the motor rotor.

In many industrial sectors, but also, for example, in the field of electric vehicle manufacture and operation, knowledge of the magnet temperature of the electric motor is absolutely essential for using suitable propulsion systems, as the motor magnets have different remanence depending on their temperature and therefore the torque constant also changes depending on the magnet temperature. If the magnet temperature is known, the torque calculation can be easily adapted accordingly.

Common methods for determining the temperature involve e.g. evaluating the EMF (electromotive force) at a corresponding speed (the EMF is also referred to as the voltage induced by rotation of the electric motor), wherein the temperature on the motor magnet can be inferred therefrom. There are also other known methods, such as field current signal injection, which can also be used to determine the motor magnet temperature.

However, all these methods assume that the electrical machine is in a rotating state and that the rotor position of the electrical machine is also known. They are therefore costly and complex to implement and use.

The object of the invention is to propose an improved method for determining electric motor magnet temperatures compared to the prior art, a method which reduces the cost/complexity involved in implementation and use for determining magnet temperatures.

SUMMARY OF THE INVENTION

This object is achieved by a temperature determination method as set forth hereinafter.

To achieve the object, a method for determining magnet temperatures on electric motor magnets is proposed, comprising the following steps in a test mode: applying a first voltage to at least one test winding of a test motor with test magnets to impress a first voltage-time area at first angles of a test motor rotating field, wherein the test magnets are subjected to at least one predefined magnet temperature, determining first current values at the test angles and storing the first current values as a function of the at least one predefined magnet temperature, and the following steps in normal mode: subsequently applying a second voltage to at least one motor winding of an operational motor with magnets to subsequently impress a second voltage-time area at second angles of a motor rotating field, wherein the motor magnets have an operation-dependent magnet temperature, subsequently determining second current values at the second angles, subsequently storing the second current values as a function of the operation-dependent magnet temperature and determining the operation-dependent magnet temperature by comparing at least one of the second current values of the operation-dependent magnet temperature with at least one of the first current values of the at least one predefined magnet temperature.

Due to saturation in the iron or more specifically inductive saturation, currents flowing in the magnetic field direction in windings of electric motors, i.e. in the direction of the magnets disposed on the electric motor, are greater than currents less closely oriented to the magnetic field of the magnets when voltage-time areas are impressed. This electrical relationship makes it possible, for example, to determine the rotor position angle of the electric motor.

The magnitude of the current values determined depends on the inductance of the winding of the electric motor in conjunction with the angle of the rotating field of the electric motor. If the test motor is structurally no different from the operational motor, the maximum current flowing in the windings of the test motor and the operational motor is proportional to the voltage-time areas impressed in the test winding of the test motor or the motor winding of the operational motor and proportional to the magnetic field strength of the test magnets of the test motor or of the motor magnets of the operational motor.

This means that, in the case of equally impressed voltage-time areas, for example, the maximum current values determined, i.e. the currents determined at the angles, only vary as a function of the magnetic field strength that produces the saturation. The magnetic field strength is inversely proportional to the temperature.

The temperature determination method is carried out using a test mode and a normal mode.

The test mode is usually carried out in a test environment which usually does not correspond to a user-related site of operation. However, such a test mode also includes other operating modes such as commissioning of a propulsion system or a troubleshooting mode. The test motor is usually representative of a motor series.

In normal mode, operational motors of the motor series are generally operated in an application-specific manner. This means that in normal mode, the operational motor(s) are used as intended manner in a user environment. The test motor and the operational motor are preferably from the same motor series, although these motors may also have differences in design and electrical rating, for example.

In test mode, the test magnets on the test motor of a motor series are preferably subjected to different predefined magnet temperatures. Subjected means that the test magnets of the test motor assume the applied magnet temperature during test operation.

Depending on the design of the test motor, single-phase or multi-phase, the first voltage is applied to the at least one test winding of the test motor to impress the first voltage-time area. This takes place at selected first angles of a test motor rotating field of the test motor, wherein the first angles extend over an angular range of advantageously 360°. The test motor rotating field of the test motor is a rotating electric field on the type known, for example, from space vector modulation of a vector control system for operating electric motors as a fixed-stator rotating electric field.

The first voltage-time area is formed such that the first voltage is applied to the at least one test winding of the test motor at a predefined level over a predefined time.

By repeatedly impressing the first voltage-time areas at the first angles in the at least one test winding, a current flow is generated which is determined as the first current value and stored on a first storage medium as a function of the predefined magnet temperature.

The first current value can be determined such that the first current value is measured e.g. on the at least one test winding of the test motor or is determined by calculation using other electrical variables that can be determined on the test motor. This and other activities for operating the test motor can be carried out using an electrical converter with a corresponding open- and closed-loop control unit.

In normal mode, the operation-dependent magnet temperature is attained for the motor magnets of the operational motor of the motor series. This initially unknown operation-dependent magnet temperature is now advantageously determined in normal operation by the temperature determination method, wherein the first current values determined and stored in test mode for the common motor series are used as a function of the predefined magnet temperature.

Depending on the design of the operational motor, single-phase or multi-phase, the second voltage is applied to the at least one motor winding of the test motor to impress the second voltage-time area. This is done at selected second angles of a motor rotating field of the operational motor, wherein the second angles extend over the angular range. As in the case of the test motor, the motor rotating field of the operational motor is a rotating electric field as is known, for example, from space vector modulation of the vector control system for operating electric motors as a fixed-stator rotating electric field.

The second voltage-time area is formed such that the second voltage is applied to the at least one motor winding of the operational motor over a predefined time at a predefined level.

In the at least one motor winding, a current flow is generated by repeatedly impressing the second voltage-time areas at the second angles, said current flow being determined as the second current value and stored on a second storage medium as a function of the operation-dependent magnet temperature.

The second current value can be determined such that the second current value is measured, for example, on the at least one motor winding of the operational motor or is determined by calculation using other electrical variables that can be determined on the operational motor. This and other activities for operating the operational motor can be carried out by means of an electrical converter with a corresponding open- and/or closed-loop control unit.

In principle, it is advantageous for the temperature determination method, or at least parts thereof, to be carried out by means of a processor unit, e.g. an electrical converter.

Advantageous embodiments of the charging current method are set forth in the dependent claims.

In a first advantageous embodiment of the temperature determination method, a first maximum current value is determined from the first current values for the at least one predefined magnet temperature and stored, a second maximum current value is determined from the second current values for the operation-dependent magnet temperature and stored, and the temperature determination of the operation-dependent magnet temperature is carried out by comparing the second maximum current value of the operation-dependent magnet temperature with the first maximum current value of the at least one predefined magnet temperature.

The operation-dependent magnet temperature is now determined by comparing at least one of the stored second current values of the operation-dependent magnet temperature with at least one of the stored first current values of the at least one predefined magnet temperature.

In a further advantageous embodiment of the temperature determination method, the operation-dependent magnet temperature is equal to the at least one predefined magnet temperature if the second maximum current value is equal to the first maximum current value.

In this advantageous embodiment, the operation-dependent magnet temperature can be determined precisely.

In a further advantageous embodiment of the temperature determination method, the operation-dependent magnet temperature is estimated for the at least one predefined magnet temperature if the second maximum current value is not equal to the first maximum current value.

This estimation is advantageously carried out e.g. on the basis of the size of the second current value in relation to the first current value and, if necessary, with knowledge of a maximum permissible current value for the motors of the motor series.

In a further advantageous embodiment of the temperature determination method, a characteristic is formed from the respective first maximum current values of a plurality of predefined magnet temperatures, and the temperature determination of the operation-dependent magnet temperature is carried out by comparing the second maximum current value of the operation-dependent magnet temperature with the respective first maximum current values of the characteristic as a function of the plurality of predefined magnet temperatures.

The first maximum current values for the plurality of predefined magnet temperatures can be entered into the characteristic. A determined second current value can then be mirrored against the first maximum current values of the characteristic, wherein the operation-dependent magnet temperature is advantageously determined by comparing it with the first maximum current values and linking them to the respective predefined magnet temperatures.

The characteristic is to be understood in a very broad sense, so that, for example, tables or comparable data formats, especially in electronic form, also fall under the term characteristic. The characteristic can also take the form of a curve.

In a further advantageous embodiment of the temperature determination method, the operation-dependent magnet temperature is equal to one of the plurality of predefined magnet temperatures if the second maximum current value is equal to one of the first maximum current values of the characteristic as a function of one of the plurality of predefined magnet temperatures.

In this advantageous embodiment, the operation-dependent magnet temperature can be determined precisely.

In a further advantageous embodiment of the temperature determination method, the operation-dependent magnet temperature is estimated in relation to the closest of the plurality of predefined magnet temperatures if the second maximum current value is not equal to the first maximum current values of the characteristic as a function of the plurality of predefined magnet temperatures.

This estimation can be advantageously performed, for example, by interpolating the second maximum current value between the known first maximum current values.

In a further advantageous embodiment of the temperature determination method, test mode is carried out when the test motor is at rest and normal mode is carried out when the operational motor is at rest.

This example is particularly advantageous because, in particular the operational motor, which may already be installed in a system, does not have to be in rotation, which means that any load connected to the operational motor does not have to be moved. The same applies analogously to test mode, so that operating hazards that could otherwise occur when using rotating or otherwise moving electrical machines are also reduced in test mode. Basically, the operational overhead when the motors are at rest is lower than with rotating motors.

The temperature determination method also does not require any information about the rotor position of the respective motor, either in test mode of the test motor or in normal mode of the operational motor.

In a further advantageous embodiment of the temperature determination method, the test magnets of the test motor and the motor magnets of the operational motor are designed as permanent magnets.

The use of permanent magnets in synchronous motors, for example, offers advantages over motors with an externally excited magnet both from a structural point of view—smaller design envelope, fewer motor components—and from an electrical point of view—no separate energy required to generate the magnetic field.

In a further advantageous embodiment of the temperature determination method, the second voltage-time area in normal mode is equal to the first voltage-time area in test mode.

If the impressed first and second voltage-time areas for developing and determining the first and second current values in test mode versus normal operation are the same, the accuracy for determining the operation-dependent magnet temperature of normal operation is advantageously increased compared to using different first and second voltage-time areas.

Accordingly, the same electrical conditions exist in terms of the impressed voltage-time areas.

In another advantageous embodiment of the temperature determination method, the first angles are equal to the second angles in number and respective angular values.

If the first and second angles for impressing the voltage-time areas for developing and determining the first and second current values are the same in number and respective angular values in test mode versus normal operation, the accuracy for determining the operation-dependent magnet temperature of normal operation is advantageously increased compared to using a different number and different respective angular values of the first and second angles.

Accordingly, the same electrical conditions exist for the first and second angles from the point of view of impressing the voltage-time areas.

BRIEF DESCRIPTION OF THE DRAWING

The above-described properties, features and advantages of the present invention and the manner in which they are achieved will become clearer and more readily understandable in connection with the following description of the exemplary embodiments which will be explained in more detail with reference to the accompanying drawings in which:

FIG. 3 shows a schematic diagram for determining an operation-dependent magnet temperature for the temperature determination method according to the invention as shown in FIG. 1 or 2, and FIG. 4 shows a schematic diagram with a current curve of second current values determined in normal mode as a function of determined operating temperatures.

DETAILED DESCRIPTION OF PREFERRED EMBODIMENTS

Figure 1:
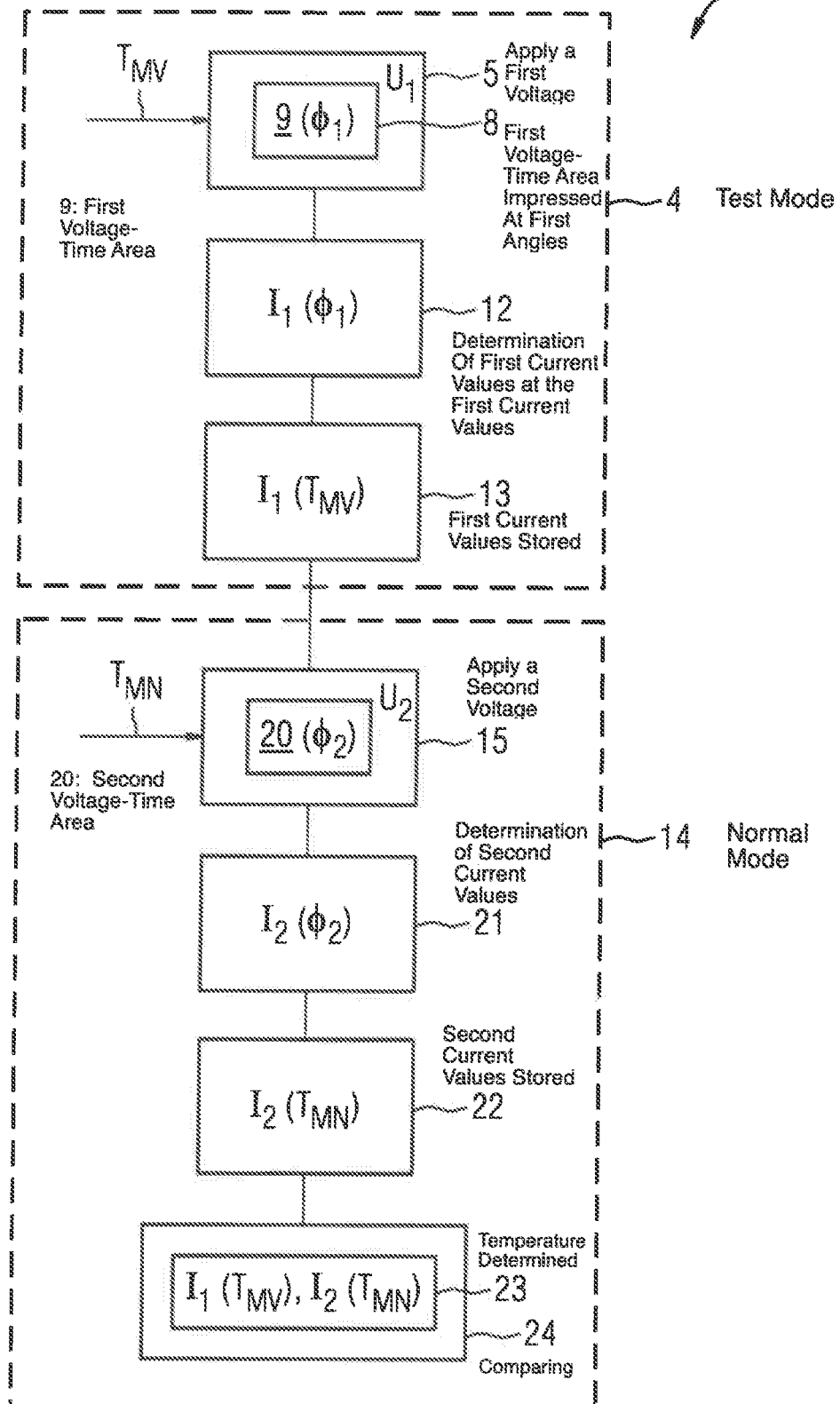
FIG. 1 schematically illustrates the temperature determination method according to the invention by means of a structogram, FIG. 2 schematically illustrates a motor model for a test motor In test mode and an operational motor in normal mode for the temperature determination method according to the invention as shown in FIG. 1.

FIG. 1 schematically illustrates the temperature determination method 1 according to the invention by means of a structogram.

The temperature determination method 1 is used to determine magnet temperatures on the magnets of electric motors.

In a test mode 4 of the temperature determination method 1, the following steps are carried out.

By applying 5 a first voltage $U_1$ to at least one test winding of a test motor 7 having test magnets 11, a first voltage-time area 9 is impressed 8 at first angles $\phi_1$ of a test motor rotating field.

The test magnets 11 are subjected to at least one predefined magnet temperature $T_{MV}$ for this purpose.

Determination 12 of first current values $I_1$ at the first angles $\phi_1$ is carried out and the first current values $I_1$ are stored 13 as a function of the at least one predefined magnet temperature $T_{MV}$.

The steps of the test mode can be repeated in order to determine and store corresponding first current values as a function of the respective predefined magnet temperature $T_{MV}$ for further predefined magnet temperatures $T_{MV}$.

In normal mode 14 of the temperature determination method 1, the following steps are carried out.

On subsequent application 15 of a second voltage $U_2$ to at least one motor winding of an operational motor with motor magnets 18, a second voltage-time area 20 is subsequently impressed 19 at second angles $\phi_2$ of an operational motor's rotating field.

Here the motor magnets have an operation-dependent magnet temperature $T_{MN}$ arising accordingly on the motor magnets during normal mode 14.

Second current values $I_2$ are subsequently determined 21 at the second angles $\phi_2$ and the second current values $I_2$ are subsequently stored 22 as a function of the operation-dependent magnet temperature $T_{MN}$.

Temperature determination 23 of the operation-dependent magnet temperature $T_{MN}$ is performed by comparing 24 at least one of the second current values $I_2$ of the operation-dependent magnet temperature $T_{MN}$ with at least one of the first current values $I_1$ of the at least one predefined magnet temperature $T_{MV}$.

For further elaboration of the temperature determination method 1, additional steps will now be presented which are not shown or not completely shown in FIG. 1.

From the first current values $I_1$ for the at least one predefined magnet temperature $T_{MV}$, a first maximum current value is determined and stored, and from the second current values $I_2$ for the operation-dependent magnet temperature $T_{MN}$, a second maximum current value is determined and stored.

In the case of the maximum current values determined, the operation-dependent magnet temperature $T_{MN}$ is determined 23 by comparing 24 the second maximum current value of the operation-dependent magnet temperature $T_{MN}$ with the first maximum current value of the at least one predefined magnet temperature $T_{MV}$.

If the second maximum current value is not equal to the first maximum current value, the operation-dependent magnet temperature $T_{MN}$ is determined in relation to the at least one predefined magnet temperature $T_{MV}$.

A characteristic can also be formed from the respective first maximum current values of a plurality of predefined magnet temperatures $T_{MV}$. The operation-dependent magnet temperature $T_{MN}$ is then determined 23 by comparing 24 the second maximum current value of the operation-dependent magnet temperature $T_{MN}$ with the respective first maximum current values of the characteristic in relation to the plurality of predefined magnet temperatures $T_{MV}$.

If at this point the second maximum current value is not equal to the respective first maximum current values of the characteristic as a function of the plurality of predefined magnet temperatures $T_{MV}$, the operation-dependent magnet temperature $T_{MN}$ is estimated to a closest of the plurality of predefined magnet temperatures $T_{MV}$. Interpolation methods can be used for the estimation.

Figure 2:
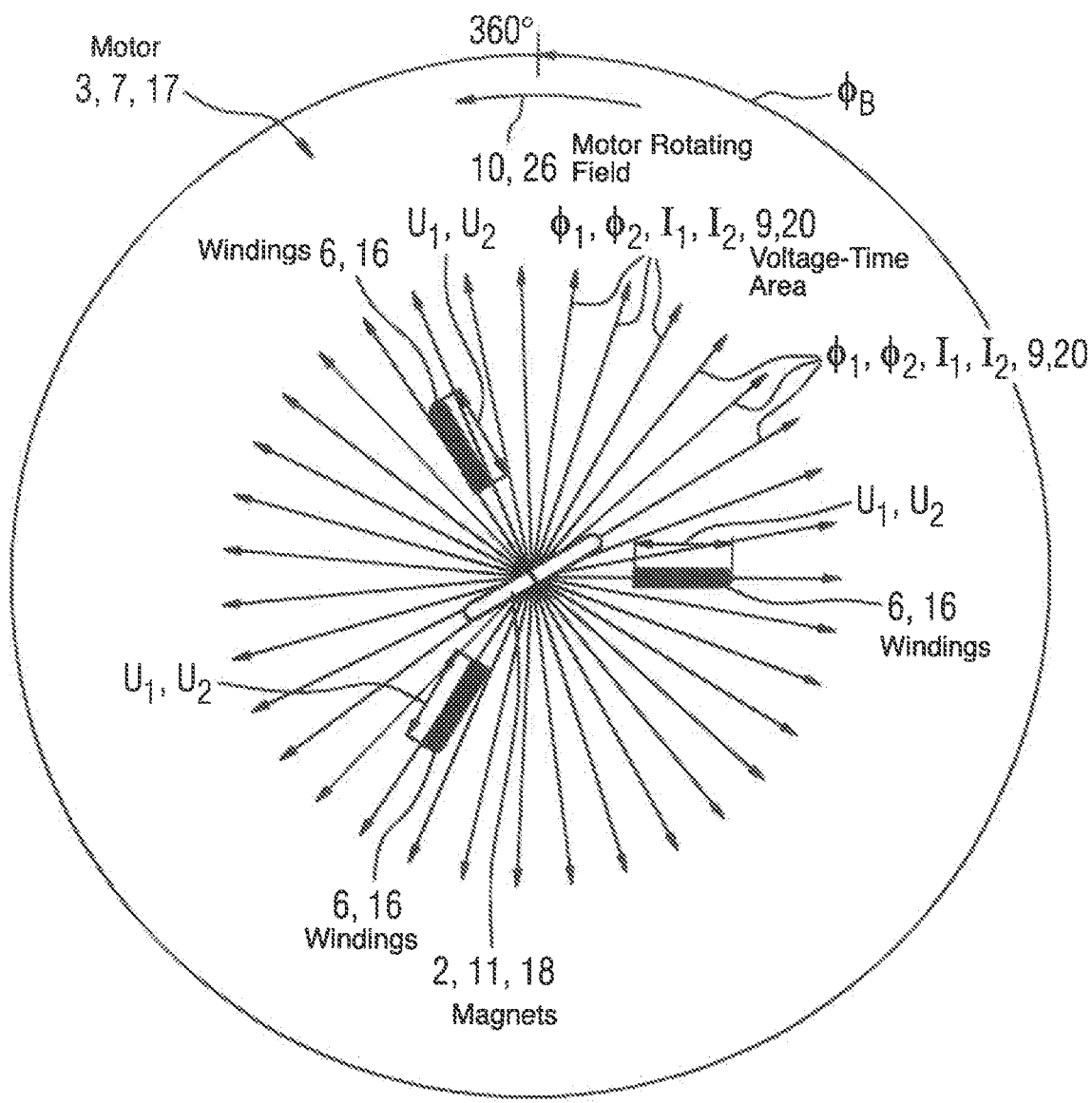

FIG. 2 schematically illustrates a motor model which describes both a test motor 7 in test mode and an operational motor 17 in normal mode, in each case as a motor 3 for the temperature determination method according to the invention as shown in FIG. 1.

Schematically, three windings are disposed around magnets 2 of the motor 2, three test windings 6 in respect of the test motor 7 and three motor windings 16 in respect of the operational motor 17, here in the sense of a three-phase AC motor.

Similarly to the description of FIG. 1, the first voltage $U_1$ is applied to each of these windings 6, 16 for test mode on the test windings 6 and the second voltage $U_2$ is applied to the motor winding 16 for normal mode.

In test mode, the first voltage-time area 9 is impressed in the test winding 6 at the first angles $\phi_1$ over an angular range $\phi_B$ here of 380° and the first current value $I_1$ is determined in each case. Similarly, in normal mode the second voltage-time area 20 is impressed in the test winding 16 over the angular range $\phi_B$ at the second angles $\phi_2$ and the second current value $I_2$ is determined in each case.

The first angles $\phi_1$ describe a test motor rotating field 10 as a fixed-stator rotating electrical field of the test motor 7 in test mode and the second angles $\phi_2$ describe a motor rotating field 26 as a fixed-stator electrical rotating field of the operational motor 17 in normal mode.

FIG. 3 shows a schematic diagram for determining an operation-dependent magnet temperature $T_{MN}$ for the temperature determination method 1 according to the invention as shown in FIG. 1 or 2.

A first coordinate axis of the diagram shows the predefined magnet temperature $T_{MV}$ and the operation-dependent magnet temperature $T_{MN}$ as temperature in ° C. plotted against a second coordinate axis of first maximum current values $I_{1max}$ and second maximum current values $I_{2max}$ as current in A.

The first maximum current values $I_{1max}$—maximum first current value $I_{11max}$, maximum second current value $I_{12max}$, maximum third current value $I_{13max}$ and maximum fourth current value $I_{14max}$—determined in test mode as a function of the specified magnet temperature form the characteristic 25.

For this purpose, a second maximum current value $I_{2max}$ was determined in normal mode, which value is reflected in the characteristic 25. The second maximum current value $I_{2max}$—here 5.9 A—results in a temperature of 75° C. shown on the first coordinate axis.

The maximum first current value $I_{11max}$ was determined at a first angular value $\phi_{11}$ of the first angle $\phi_1$, the maximum second current value $I_{12max}$ at a second angular value $\phi_{12}$ of the first angle $\phi_1$, the maximum third current value $I_{13max}$ at a third angular value $\phi_{13}$ of the first angle $\phi_1$ and the maximum fourth current value $I_{14max}$ at a fourth angular value $\phi_{14}$ of the first angle $\phi_1$.

The second maximum current value $I_{2max}$ was determined at the second angle $\phi_2$.

FIG. 4 shows a schematic diagram with current curves of second current values $I_2$ determined in normal mode as a function of determined operation-dependent magnet temperatures $T_{MN1}$, $T_{MN2}$, $T_{MN3}$, $T_{MN4}$.

A first coordinate axis of the diagram shows second current values $I_2$ as currents in A, plotted against a second coordinate axis with second angles $\phi_2$ at which the second current values $I_2$ were determined in normal mode.

As a result of the diagram, the operation-dependent magnet temperatures determined in normal mode are shown in the form of curves of a temperature profile of a first operation-dependent magnet temperature $T_{MN1}$ above a second operation-dependent magnet temperature $T_{MN2}$, a third operation-dependent magnet temperature $T_{MN3}$ and a fourth operation-dependent magnet temperature $T_{MN4}$.

From the height of the curves of the respective operation-dependent magnet temperatures $T_{MV1}$, $T_{MV2}$, $T_{MV3}$ and $T_{MV4}$, it is possible to determine the prevailing magnetism quality of the motor magnets of the operational motor in normal mode.

Thus, the curve of the fourth operation-dependent magnet temperature $T_{MN4}$ shows a clear loss of magnetism at this fourth operation-dependent magnet temperature $T_{MN4}$.

What is claimed is:

1. A temperature determination method for magnet temperatures on magnets of electric motors, the method comprising:
   in test mode:
     applying a first voltage to a test winding of a test motor with test magnets to impress a first voltage-time area at first angles of a test motor rotating field, wherein the test magnets are subjected to a predefined magnet temperature;
     determining first current values at the first angles; and
     storing the first current values as a function of the predefined magnet temperature;
   and in normal mode:
     subsequently applying a second voltage to a motor winding of an operational motor with motor magnets to subsequently impress a second voltage-time area at second angles of an operational motor rotating field, wherein the motor magnets have an operation-dependent magnet temperature;
     subsequently determining second current values at the second angles;

subsequently storing the second current values as a function of the operation-dependent magnet temperature; and determining the operation-dependent magnet temperature by comparing a second current value of an operation-dependent magnet temperature with a first current value of a predefined magnet temperature.

2. The temperature determination method of claim 1, further comprising:

determining and storing a first maximum current value from the first current values for the predefined magnet temperature; and determining a second maximum current value from the second current values for the operation-dependent magnet temperature;

wherein the operation-dependent magnet temperature is determined by comparing the second maximum current value of the operation-dependent magnet temperature with the first maximum current value of the predefined magnet temperature.

3. The temperature determination method of claim 2, wherein the operation-dependent magnet temperature is equal to the predefined magnet temperature when the second maximum current value is equal to the first maximum current value.

4. The temperature determination method of claim 2, wherein the operation-dependent magnet temperature is estimated at the predefined magnet temperature when the second maximum current value is not equal to the first maximum current value.

5. The temperature determination method of claim 2, further comprising forming a characteristic from respective first maximum current values of a plurality of predefined magnet temperatures, wherein the temperature of the operation-dependent magnet temperature is determined by comparing the second maximum current value of the operation-dependent magnet temperature with the respective first maximum current values of the characteristic as a function of the plurality of predefined magnet temperatures.

6. The temperature determination method of claim 5, wherein the operation-dependent magnet temperature is equal to one of the plurality of predefined magnet temperatures when the second maximum current value is equal to a first maximum current value of the characteristic as a function of one of the plurality of predefined magnet temperatures.

7. The temperature determination method of claim 5, wherein the operation-dependent magnet temperature is estimated at a closest of the plurality of predefined magnet temperatures when the second maximum current value is not equal to the respective first maximum current values of the characteristic as a function of the plurality of predefined magnet temperatures.

8. The temperature determination method of claim 1, further comprising:

carrying out the test mode when the test motor is at rest; and carrying out the normal mode when the operational motor is at rest.

9. The temperature determination method of claim 1, wherein the test magnets of the test motor and the motor magnets of the operational motor are designed as permanent magnets.

10. The temperature determination method of claim 1, wherein the second voltage-time area in the normal mode Is equal to the first voltage-time area in the test mode.

11. The temperature determination method of claim 1, wherein the first angles are equal in number and respective angular values to the second angles.

\* \* \* \* \*